April 26, 1927.  E. L. LARSON  1,626,542
HYDRAULIC BRAKE
Filed April 30, 1926  3 Sheets-Sheet 1

E. L. Larson INVENTOR

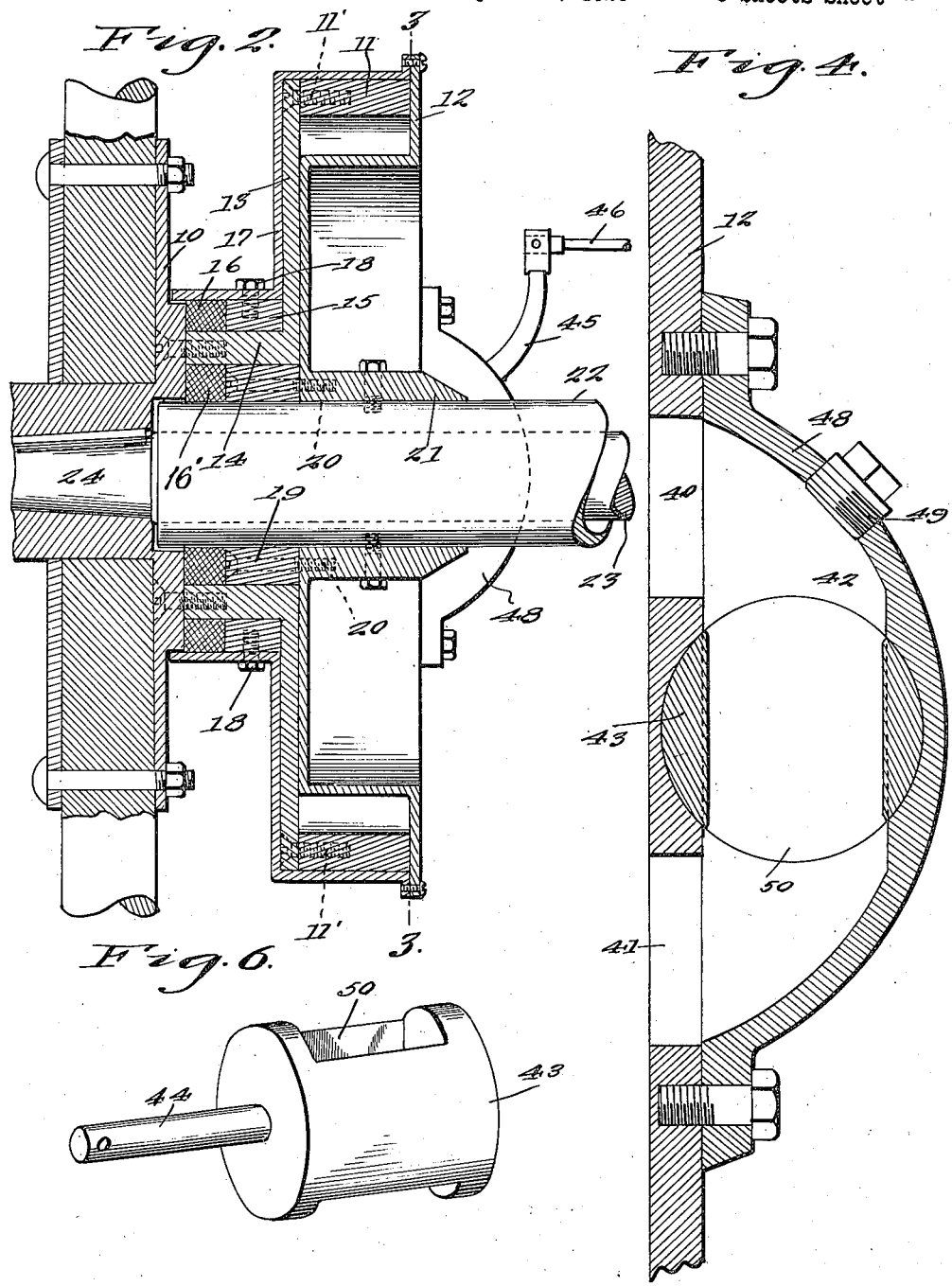

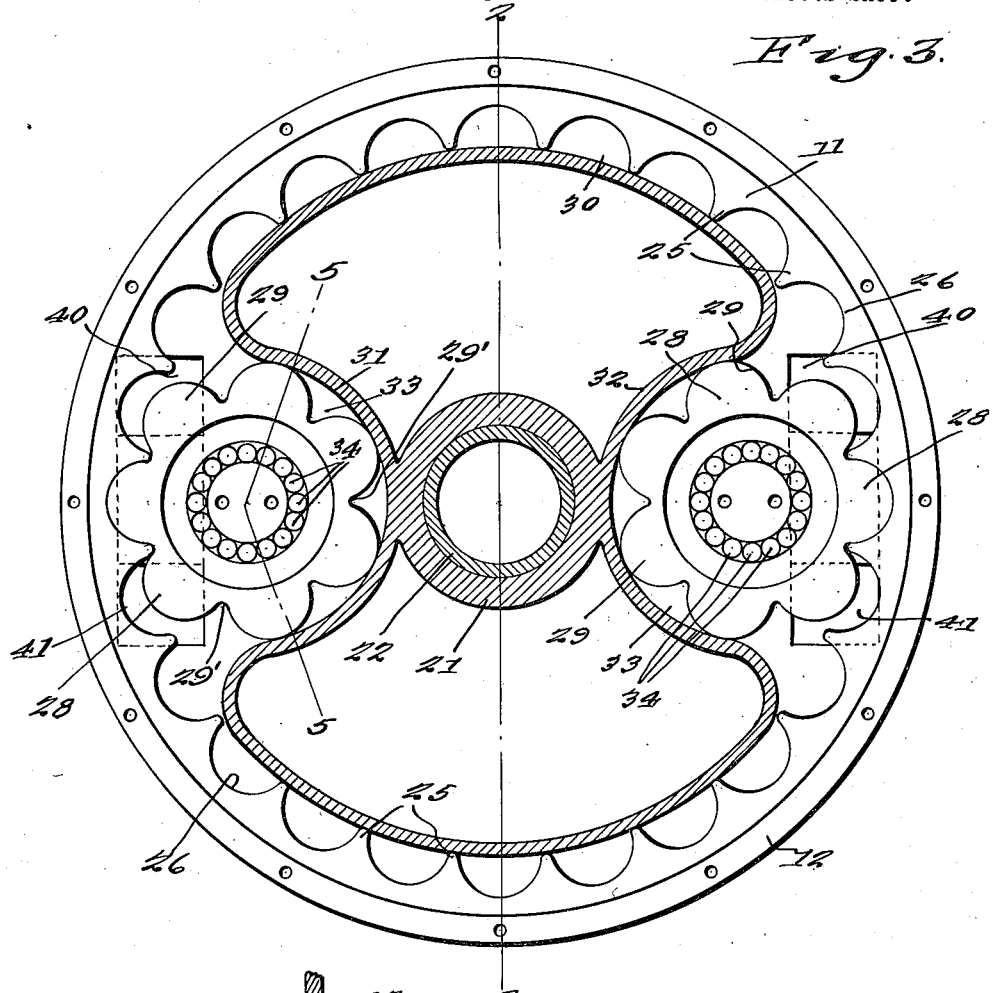

Patented Apr. 26, 1927.

1,626,542

UNITED STATES PATENT OFFICE.

ELVIN L. LARSON, OF ABERDEEN, WASHINGTON.

HYDRAULIC BRAKE.

Application filed April 30, 1926. Serial No. 105,803.

The object of this invention is to provide a brake especially adapted for use on motor cars and trucks, and one which will insure even and positive operation without frictional engagement, so that the device will be serviceable in a maximum degree for an indefinite period and will not be subject to temperature changes, will not be affected by water, and will require no adjustment.

A further object is to provide a device which shall include a gear ring and pinions meshing therewith, these elements being of special construction and being mounted within a casing providing a valve controlled channel or channels thru which the fluid to be employed is allowed to flow when desired, or is retarded in any degree, in accordance with the braking effect required.

With the foregoing and other objects in view, the invention consists in the novel construction and arrangement of elements described, illustrated and claimed, it being understood that modifications may be made within the scope of the claims without departing from the spirit of the invention.

In the drawings forming part of this application,

Figure 1 constitutes a vertical transverse section thru an axle housing, the housing for the brake mechanism being in elevation, with the casing of one valve in section.

Figure 3 is a section on line 3—3 of Figure 2.

Figure 4 is a vertical section thru the elements providing a valve controlled passage for the fluid.

Figure 5 is a section on line 5—5 of Figure 3.

Figure 6 is a perspective view of one of the valves.

Figure 7 is a detail view showing the manner of connecting a controlling rod with arms 45 for shifting the valves.

Figure 1:
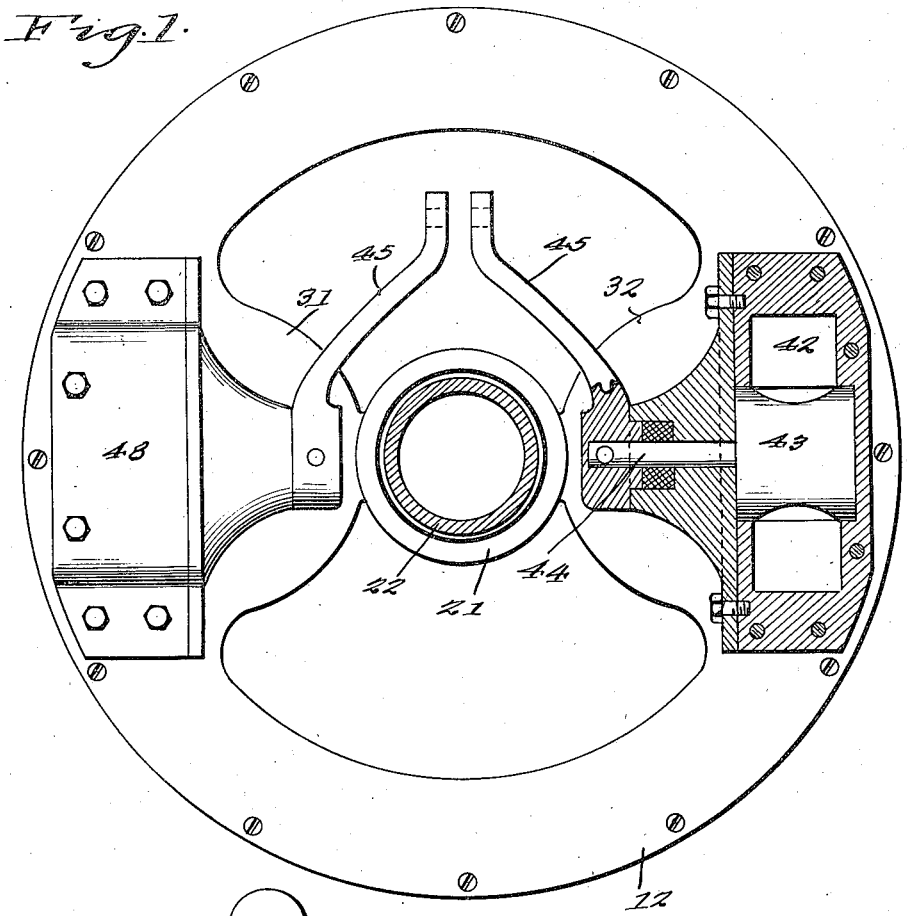
Figure 2:
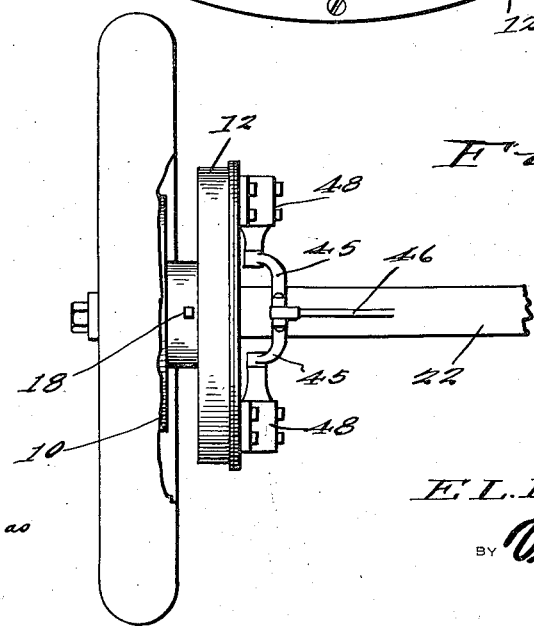
Figure 2 is a section on line 2—2 of Figure 3.

The hub portion of a wheel is designated 10, and rotatable therewith is a gear ring 11 operating in a housing 12 of the form shown in vertical section in Figure 2. The mounting means for the gear ring includes plate 13 and annular portion 14 surrounded by a brass bearing or collar 15 which bears against a felt washer 16, the latter also abutting the hub plate. An element 17 of the housing 12 is secured by bolt or bolts 18 to member 15, and a brass bearing 19 is secured by screws or bolts 20 to the inner annular element 21 which in turn is secured to the axle housing 22. A felt washer appears also at 16'. The axle per se is shown at 23, and the reduced cone end thereof is designated 24.

The gear ring 11 is secured to the element 13 before referred to by means of bolts or screws 11', and this ring 11 is provided with teeth 25, a web between the teeth, being shown at 26 and representing approximately a semi-circle. Pinions or tumblers 28 include teeth 29 having a curved or semi-circular engaging portion for cooperation with the concaved portions 26, the depressions 29' between the teeth being opposite teeth 25 of the ring when the cooperating teeth are fully engaged.

The housing 12 provides an annular chamber 30 for the gear ring, but web portions 31 and 32 provide chambers 33 merging into the channel 30, and accommodating the pinions 28. Anti-friction bearing are designated 34, being shown in end elevation in Figure 3 and side elevation in Figure 5.

A mixture of flake graphite and castor oil, in the form of a light paste, is employed as a lubricant, no other fluid or form of lubrication being required. In Figures 3 and 4 the chambers 33 communicate with ports 40 and 41, the ports having communication with each other thru passage ways 42 when the valves 43 are open. The stems 44 of the valves are controlled by arms 45, which in Figure 7 are reversely positioned and are controlled by a rod 46 serving as an operating element. A cap member 48 is provided for each valve casing, and a screw plug 49 affords access to this casing. The valves are of the form shown in Figure 6, and also illustrated elsewhere, and they each include a port 50 extending entirely therethru.

The position of the valves 43, and the ports 50 thereof determine the operation of the brake. The valves are at all times in the same relative position, and the flow of the mixture of graphite and oil, or the rate of flow, depends upon the position of the valves, very accurate or fine control of the brakes being thereby provided. If the valves are fully open the gear ring and pinions will operate as freely as required, and the fluid will pass thru the channels referred to above, but if the flow is retarded by the operation of the valves the braking effect desired will be realized. The complete closing of the valves results in complete braking action, the whole movement being gradual and leading to a definite and positive result.

Having described the invention what is claimed is:—

1. In a device of the class described, a rotatable gear ring having internal teeth, a housing for mounting the gear ring and providing an annular channel, chambers communicating with the channel, pinions mounted in the chambers and meshing with the gear ring, valve casings having ports communicating with the chambers on opposite sides of the axis of each pinion, and a valve within each valve casing and adapted to control the passage of material thru the chambers and valve casings, incident to the rotation of the gear ring and pinions.

2. In a device of the class described, a rotatable gear ring having internal teeth, a housing for mounting the gear ring and providing an annular channel, chambers communicating with the channel, pinions mounted in the chambers and meshing with the gear ring, valve casings having ports communicating with the chambers on opposite sides of the axis of each pinion, and a valve within each valve casing and adapted to control the passage of material thru the chambers and valve casings, incident to the rotation of the cam ring and pinions, said valves being mounted diametrically opposite each other and on axes perpendicular to the axes of the pinions, and means for controlling the valves simultaneously.

3. In a device of the class described, a rotatable gear ring having internal teeth, and elements to be braked connected with the gear ring, a housing for mounting the gear ring, the housing having chambers therein and having an annular channel, an axle, an axle housing mounting the housing first named, pinions mounted in the chambers and meshing with the gear ring, valve casings having ports communicating with the chambers on opposite sides of the axis of each pinion, and a valve within each valve casing and adapted to control the passage of fluid thru the chambers and valve casings.

4. In a device of the class described, a rotatable gear ring having internal teeth, a housing for mounting the gear ring and providing an annular channel, chambers communicating with the channel, pinions mounted in the chambers and meshing with the gear ring, the pinions having teeth of approximately semi-circular form, and the gear ring having concavities of similar form between the teeth thereof, valve casings having ports communicating with the chambers on opposite sides of the axis of each pinion, and a valve within each valve casing and adapted to control the passage of material thru the chambers and valve casings, incident to the rotation of the cam ring and pinions.

In testimony whereof I affix my signature.

ELVIN L. LARSON.